US008719231B2

(12) United States Patent
Jotanovic et al.

(10) Patent No.: US 8,719,231 B2
(45) Date of Patent: May 6, 2014

(54) GEOGRAPHIC BASED MEDIA CONTENT DELIVERY INTERFACE

(75) Inventors: Mark Aleksandar Jotanovic, Saline, MI (US); Eric Randell Schmidt, Northville, MI (US); Jeffrey Edward Pierfelice, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 310 days.

(21) Appl. No.: 13/074,930

(22) Filed: Mar. 29, 2011

(65) Prior Publication Data

US 2012/0254223 A1  Oct. 4, 2012

(51) Int. Cl.
*G06F 17/30* (2006.01)

(52) U.S. Cl.
USPC ........... 707/687; 707/607; 707/609; 707/813; 707/899

(58) Field of Classification Search
CPC .................................................. G06F 17/3074
USPC .................. 707/607, 609, 687, 790, 813, 899
See application file for complete search history.

(56) References Cited

U.S. PATENT DOCUMENTS

| | | |
|---|---|---|
| 5,864,753 A | 1/1999 | Morita et al. |
| 2003/0040272 A1 | 2/2003 | Lelievre et al. |
| 2003/0054831 A1 | 3/2003 | Bardmesser |
| 2006/0031548 A1 | 2/2006 | Funchess |
| 2006/0105702 A1 | 5/2006 | Muth et al. |
| 2006/0128301 A1 | 6/2006 | Dorfstatter et al. |
| 2008/0045170 A1 | 2/2008 | Howley et al. |
| 2008/0192736 A1 * | 8/2008 | Jabri et al. .................... 370/352 |
| 2009/0005080 A1 | 1/2009 | Forstall et al. |
| 2009/0153492 A1 * | 6/2009 | Popp .............................. 345/173 |
| 2010/0106799 A1 | 4/2010 | Calabrese |
| 2010/0241507 A1 * | 9/2010 | Quinn et al. ............... 705/14.42 |
| 2011/0125765 A1 * | 5/2011 | Tuli .............................. 707/751 |

* cited by examiner

*Primary Examiner* — Sana Al Hashemi
(74) *Attorney, Agent, or Firm* — Snell & Wilmer LLP

(57) ABSTRACT

A media content delivery interface for delivering media content based on a geographic location of a user. The media content delivery interface may include a mapping device configured to receive a positioning signal and determine a geographic location of a media playing device based on the positioning signal, a processor configured to receive the geographic location from the mapping device and generate a search signal for searching a media database for a media file having a geographic property related to the geographic location, and a distribution device coupled to the processor, configured to selectively distribute the searched media file from the media database to the media player device.

22 Claims, 7 Drawing Sheets

GEOGRAPHIC BASED MEDIA CONTENT DELIVERY INTERFACE

BACKGROUND

1. Field

The present invention generally relates to the field of media content distribution, and more particularly to a geographic based media content delivery interface.

2. Description of the Related Art

In recent years, various music delivery services have emerged in the market. These music delivery services are distinguishable from conventional radio broadcast services because they allow a user to select the types of songs to be played. Among other music delivery services, satellite radio service and Internet radio service are two popular options. Generally, satellite radio service and/or Internet radio service may include various dedicated channels. Each dedicated channel may deliver music of a particular genre. For example, one dedicated channel may only deliver rhythm and blue (R&B) songs, while another dedicated channel may only deliver classics songs. Accordingly, the user may listen to his or her favorite types of music by selecting one or more dedicated channels.

The preference of a user, however, may go beyond generic genre and may depend on the current geographic location of the user. For example, some users may want to explore local music as they travel. At the current state, satellite radio and/or Internet radio services may be unable to satisfy the need of these users. Mainly, satellite radio and/or Internet radio services generally do not detect the geographic location of the user. As such, satellite radio and/or Internet radio services may lack the capability of delivering music that is relevant to the geographic location of the user.

Thus, there is a need for a music delivery interface that is capable of delivering music based on the geographic location of a user.

SUMMARY

Several embodiments of the present invention may provide a media content delivery interface. The media content delivery interface may be used for delivering media content, such as music, video, text, and/or image, based on the geographic location of a user. Particularly, the media content delivery interface may deliver media content that is relevant to a geographic region within which a user may currently locate. As such, the media content delivery interface may be adapted to perform as a music delivery interface, a movie delivery interface, a literature delivery interface, and/or a visual art delivery interface.

In one embodiment, the present invention may provide a non-transitory computer storage medium storing instructions that when executed by a processor, cause the processor to perform a method for delivering media content, which may include the steps of determining a geographic location of a media playing device, searching a media database for a media file having a geographic property related to the determined geographic location, and selectively distributing the searched media file to the media playing device.

In another embodiment, the present invention may provide a non-transitory computer storage medium storing instructions that when executed by a processor, cause the processor to perform a method for managing a media database, which may include the steps of receiving a media file, creating a record for the received media file, creating a geographic property field in the record for storing a geographic property of the received media file, and associating the record to the received media file.

In yet another embodiment, the present invention may provide a media content delivery interface, which may include a mapping device configured to receive a positioning signal and determine a geographic location of a media playing device based on the positioning signal, a processor configured to receive the geographic location from the mapping device and generate a search signal for searching a media database for a media file having a geographic property related to the geographic location, and a distribution device coupled to the processor, configured to selectively distribute the searched media file from the media database to the media player device.

This summary is provided merely to introduce certain concepts and not to identify any key or essential features of the claimed subject matter.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Apparatus, systems and methods that implement the embodiment of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between reference elements. In addition, the first digit of each reference number indicates the figure in which the element first appears.

Figure 1:
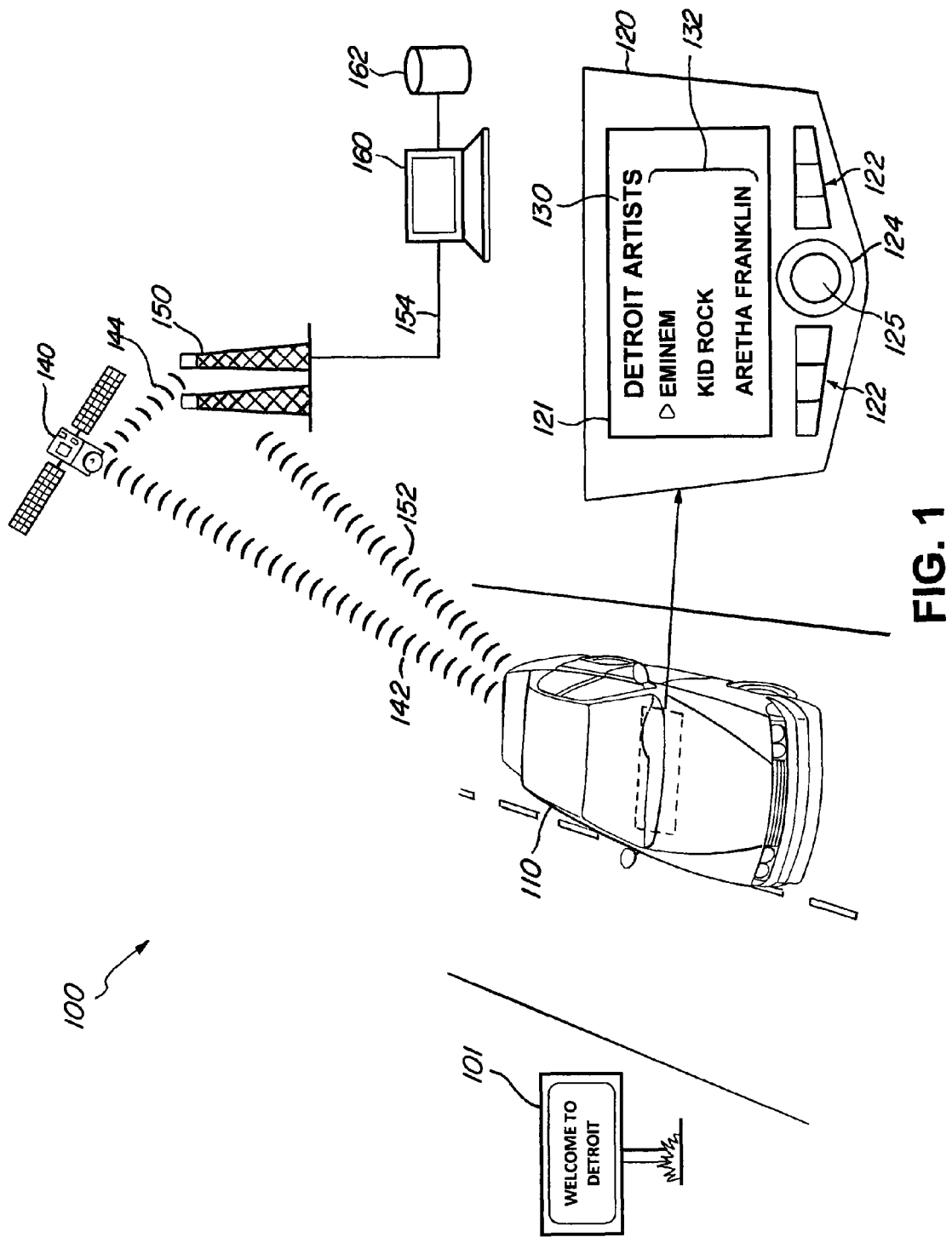
FIG. 1 shows a perspective view of a music delivery system with a music delivery interface according to an embodiment of the present invention.

FIG. 1 shows a perspective view of a music delivery system 100 according to an embodiment of the present invention. The music delivery system 100 may include a music playing device 120, a satellite 140, a music delivery interface 130, a music server 160, and a music database 162. Generally, the music delivery system 100 may be used for delivering music files based on the geographic location of a user of the music playing device 120. The music playing device 120 may be carried by the user, or alternatively, it may be installed in a motor vehicle 110. As such, the music playing device 120 may be transported to various geographic locations. The music delivery system 100 may determine a current geographic location 101 of the music playing device 120, which may be used as a proxy of the current geographic location of the user. Contemporaneously, the music delivery system 100 may search for music files that are related to the current geographic location 101 of the music playing device 120. After that, the music delivery system 100 may deliver the searched music files to the music playing device 120.

The satellite 140 may be used for tracking the position of the motor vehicle 110. The satellite 140 may be a global positioning system (GPS) satellite or any other positioning devices that are capable of tracking the position of a motor vehicle. The music delivery interface 130 may receive the tracked position from the satellite 140 via a satellite-vehicle communication signal 142. The music delivery interface 130 may then determine the current geographic location 101 of the music playing device 120. For example, the music delivery interface 130 may determine that the current geographic location 101 of the music playing device 120 is within Detroit, Mich.

After determining the current geographic location 101, the music delivery interface 130 may generate a search request for music files with geographic properties that are pertinent to the current geographic location 101. These geographic properties may include, but are not limited to, the geographic origin of the performing artist, the geographic origin of the composer, the location in which the music was first composed and/or performed, the geographic genre of the music, and/or the geographic theme of the music. For example, the music delivery interface 130 may generate a search request for music files containing music that are performed by Detroit artists. In another example, the music delivery interface 130 may generate a search request for music files containing music with themes related to Detroit.

The music delivery interface 130 may send the search request to the music server 160 to search for the requested music files. In one embodiment, the music delivery interface 130 may send the search request to the music server 160 by using a cell site tower 150. For example, the music delivery interface 130 may transmit the search request to the cell site tower 150 via a tower-vehicle communication signal 152. The tower-vehicle communication signal 152 can be a FM radio signal, an AM radio signal, a CDMA signal, a GSM signal, and/or any other long distance wireless signals. The cell site tower 150 may forward the search request to the music server 160 via a tower-server communication link 154, which may be wired or wireless.

In another embodiment, the music delivery interface 130 may send the search request to the music server 160 via the satellite 140 and the cell site tower 150. For example, the music delivery interface 130 may transmit the search request to the satellite 140, which may in turn, re-transmit the search request to the cell site tower 150 via a satellite-tower communication signal 144. The cell site tower 150 may forward the search request to the music server 160 via the tower-server communication link 154. The tower-server communication link 154 may extend through one or more communication networks, such as local area networks (LAN) and/or wide area networks (WAN).

The music server 160 may process the search request by searching the music database 162 for the requested music files. The music database 162 may be a single database or a collection of databases. The music database 162 may be used for storing and maintaining the music files. For example, the music database 162 may create one or more searchable fields for each music file. The searchable fields may contain information that is pertinent to the geographic properties of a particular music file.

After the requested music files are found, the music server 160 may send the search result to the music delivery interface 130 via the cell site tower 150 and/or the satellite 140. A user may browse the search result and select one or more searched music files by using the music playing device 120. The music playing device 120 may include a display screen 121, several multifunction buttons 122, a selection dial 124, and/or a selection button 125. The display screen 121 may be used for displaying the search result, which may, for example, include a list of performing artists 132. The user may adjust the selection dial 124 to browse through the list of performing artists 132. The user may select a particular performing artist by pressing the selection button 125.

After receiving a user selection, the music delivery interface 130 may generate a music file request based on the user selection. The music file request may include one or more music files. The music delivery interface 130 may send the music file request to the music server 160. Similar to the transmission process of the search request, the music file request may be transmitted by the satellite 140 and/or the cell site tower 150. The music server 160 may process the music file request by retrieving the requested music files from the music database 162. Then, the music server 160 may complete the music file request by sending the retrieved music files to the music delivery interface 130.

The music delivery interface 130 may download or stream the retrieved music files via the satellite 140 and/or the cell site tower 150. In one embodiment, the music files may be transmitted by the satellite 140. In another embodiment, the music files may be transmitted by the cell site tower 150. In yet another embodiment, the music files may be transmitted simultaneously, concurrently, and/or in parallel by the satellite 140 and the cell site tower 150. After downloading or streaming the music file, the music delivery interface 130 may distribute the music file to the music playing device 120. At this point, the user may instruct the music playing device 120 to perform one or more operations on the downloaded music files by using the multifunction buttons 122. For example, the user may play, pause, stop, skip, fast forward, and/or fast reverse one or more downloaded music files.

Besides processing the positioning information received from the satellite 140, the music delivery interface 130 may determine the current geographic location 101 of the music playing device 120 by identifying the geographic location of the closest cell site tower 150. In one embodiment, each predefined geographic location may be assigned with one or more cell site tower 150. When the music playing device 120 is within the predefined geographic location, the music delivery interface 130 may receive a tower-vehicle communication signal 152 from the assigned cell site tower 150. The received tower-vehicle communication signal 152 may be embedded with information pertinent to the predefined geographic location to which the cell site tower 150 is assigned. Accordingly, the music delivery interface 130 may use the tower-vehicle communication signals 152 to determine the current geographic location 101 of the music playing device 120.

In another embodiment, the music delivery interface 130 may determine the current geographic location 101 of the music playing device 120 by receiving a user generated input. For example, the user may select a current geographic location 101 by using the multifunction buttons 122. In yet another embodiment, the music delivery interface 130 may determine the current geographic location 101 of the music playing device 120 by detecting and processing signals broadcasted by local radio stations.

The music delivery interface 130 may automatically search for music files that are relevant to the current geographic location 101 of the music playing device 120. The scope of relevancy may be predefined and/or modified. For example, the scope of relevancy may include, but is not limited to, birth place of the performing artist and/or composer, place at which the song was recorded or written, theme of the song, geographic genre of the song, keywords of the song, and/or title of the song. The music delivery interface 130 may iteratively, periodically, and/or responsively update the search. Moreover, the music delivery interface 130 may access one or more Internet servers for determining the current geographic location of the music playing device 120, searching for relevant music files, and/or downloading selected music files.

In such manner, the music delivery interface 130 may allow a user to explore local music efficiently and provide a platform for local musicians to promote their music. The music delivery interface 130 may be used in conjunction with any stereo system, satellite radio system, and/or portable music player. Accordingly, the music delivery interface 130 may be particularly useful for travelers and/or drivers. Moreover, the music delivery interface 130 may be configured to identify sub-regions within a city, and hence, search for songs that are relevant to the identified sub-regions. For example, the music delivery interface 130 may distinguish between downtown Detroit and uptown Detroit. Accordingly, the music delivery interface 130 may perform a separate music file search when the music playing device 120 is transported from one sub-region to another sub-region.

The functional features of the music delivery interface 130 may be adapted to other media content delivery systems. For example, the functional features of the music delivery interface 130 may be incorporated into a media content delivery interface, which may be used for delivering video clips, music videos, motion pictures, digitized art works, digitized literatures, and/or other media contents that are relevant to a particular geographic location.

Figure 2:
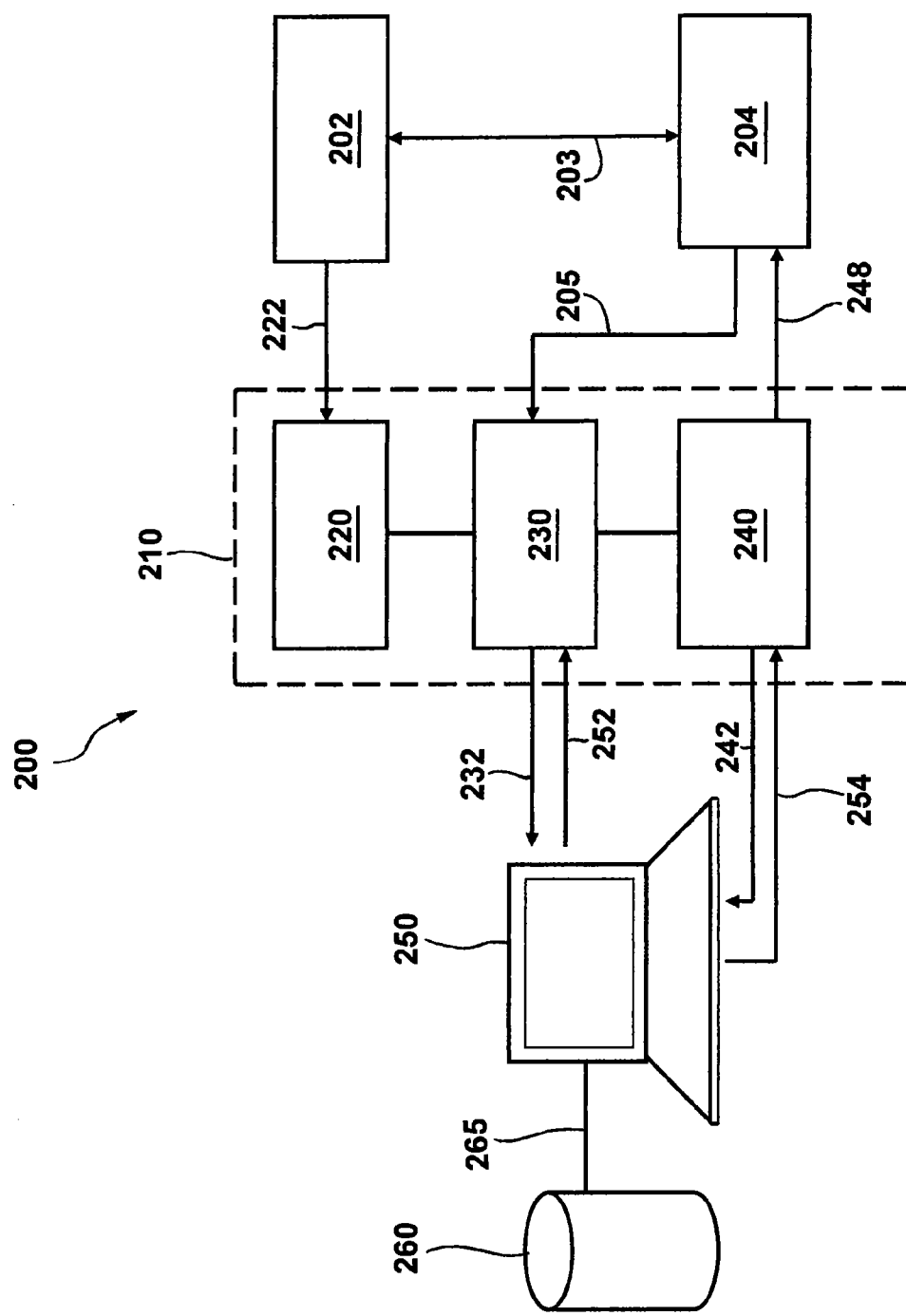
FIG. 2 shows a block diagram of a media content delivery interface for use in a media content delivery system according to an embodiment of the present invention.

FIG. 2 shows a block diagram of a media content delivery interface 210 for use in a media content delivery system 200 according to an embodiment of the present invention. The media content delivery system 200 may be used for searching and delivering media files based on the geographic location of a user. Generally, the media content delivery system 200 may include a positioning device 202, a media playing device 204, a media content delivery interface 210, a media server 250, and a media database 260.

The media playing device 204 may be any electronic device capable of processing a media file and outputting the media content contained in the processed media file. In one embodiment, for example, the media playing device 204 may be an MP3 player, a satellite radio, an Internet radio, a portable computer, a portable electronic tablet, a portable gaming console, a cellular phone, a smart phone, a radio, and/or other electronic music players. In another embodiment, for example, the media playing device 204 may be a JPEG reader, a PDF reader, an electronic word processor, and/or other electronic image readers. In yet another embodiment, for example, the media playing device 204 may be an MPEG player, a DivX player, a WMV player, an AVI player, a portable computer, a portable electronic tablet, a portable gaming console, a smart phone, a cellular phone, and/or other electronic audio-video playing devices.

The positioning device 202 may detect the position of the media playing device 204 by processing a position sensing signal 203, which may be transmitted between the positioning device 202 and the media playing device 204. The positioning device 202 may generate a position tracking signal 222 upon detecting the position of the media playing device 204. The position tracking signal 222 may be updated periodically, iteratively, and/or responsively.

In one embodiment, the positioning device 202 may be a GPS satellite, which may be used for detecting the global coordination of the media playing device 204. In another embodiment, the positioning device 202 may be stationed at a predefined geographic location, and it may detect a relative distance from the media playing device 204. When the relative distance between the media playing device 204 and the positioning device 202 is smaller than a predefined threshold value, it may be indicative that the media playing device 204 is within the predefined geographic location. For example, the positioning device 202 may be a cell site tower stationed in a city, a town, and/or a county.

In yet another embodiment, the positioning device 202 may detect the geographic location of the media playing device 204 via one or more computer networks. For example, if the media playing device 204 can access the Internet and/or other private networks, the positioning device 202 may be a network server, which may detect the position of the media playing device 204 by determining the access point of the media playing device 204.

The media content delivery interface 210 may include a mapping device 220, a processor 230, and a distribution device 240. The mapping device 220 may be used for tracking the geographic location of the media playing device 204. Particularly, the mapping device 220 may process the position tracking signal 222 received from the positioning device 202.

If the position tracking signal 222 includes the coordination of the media playing device 204, the mapping device 220 may associate the coordination with a predefined geographic zone. If the position tracking signal 222 includes the relative distance between the media playing device 204 and the positioning device 202, the mapping device 220 may compare the relative distance with a threshold value in determining whether the media playing device 204 is within a predefined geographic zone. If the position tracking signal 222 includes an access point to which the media playing device 204 is connected to, the mapping device 220 may extrapolate the physical location of the access point and associate the physical location to a predefined geographic zone.

In any event, the mapping device 220 may ascertain the current geographic location of the media playing device 204, and it may then match the current geographic location of the media playing device 204 with one or more predefined geographic zones. The predefined geographic zones may include one or more districts, counties, cities, towns, states, countries, and/or continents. The boundary of a predefined geographic zone may depend on the quantity and variety of media contents being associated to that predefined geographic zone. In one embodiment, for example, a predefined geographic zone may be associated with at least 100 media files. In another embodiment, for example, a predefined geographic zone may be associated with at least one locally produced motion picture. In yet another embodiment, for example, a predefined geographic zone may be associated with at least 100 locally produced comic books.

The processor 230 may be coupled to the mapping device 220 and the distribution device 240. The processor 230 can be any computing device capable of receiving data, processing the received data, and outputting the processed data. The processor 230 may be implemented using hardware, software, firmware, middleware, microcode, or any combination thereof. The processor 230 may be an Advanced RISC Machine (ARM), a computer, a controller, a digital signal processor (DSP), a microprocessor, circuitry, a processor chip, or any other device capable of processing data, and combination thereof.

The processor 230 may process one or more user commands 205 received from the media playing device 204. The user commands 205 may invoke one or more functions of the media content delivery interface 210. For example, the user commands 205 may prompt the processor 230 to search for a media file, to select a searched media file, to format a selected media file, and/or to download or stream a formatted media file.

When a search function is invoked, the processor 230 may receive one or more mapped geographic zones from the mapping device 220. Based on the current location of the media playing device 204, the processor 230 may generate a search request 232. The search request 232 may include one or more the search criteria that are relevant to the mapped geographic zones. For example, the search request 232 may include a search criterion that the authors of the media files are currently working and/or residing in the mapped geographic zones. In another example, the search request 232 may include a search criterion that the contents of the media files are directed to the social aspects of the mapped geographic zones.

The media server 250 may be in communication with the processor 230. Upon receiving the search request 232, the media server 250 may perform a media file search according to the search criteria included in the search request 232. The media server 250 may access the media database 260, which may store and maintain one or more media files. Each of the media files may include one or more fields for recording various geographic-based characteristics. In one embodiment, for example, each media file may include an author origin field, which may record the place of birth, education, and/or professional activities of the author of media file. Accordingly, the information recorded in the author origin field may be matched against one or more search criteria included in the search request 232.

After locating the requested media files, the media server 250 may generate a search report 252. The search report 252 may include the title of the located media files as well as various geographic-based characteristics of the located media files. The search report 252 may be transmitted to the processor 230. Upon receiving the search report 252, the processor 230 may present the search result to a user via the media playing device 204. At this point, the user may select one or more located media files by using the media playing device 204.

After receiving the user selection, the media playing device 204 may generate a user command 205 to invoke the retrieving function of the media content delivery interface 210. The processor 230 may process the user command 205 received from the media playing device 204. As a result, the processor 230 may instruct the distribution device 240 to start retrieving the selected media files.

The distribution device 240 may generate a retrieval request 242, which may include the media files to be retrieved, the priority of retrieval, and/or the mode of retrieval. In one embodiment, for example, the distribution device 240 may specify which media files to be first retrieved, last retrieved, and/or simultaneously retrieved. In another embodiment, for example, the distribution device 240 may specify the retrieve rates and/or the buffering schemes of the selected media files.

In responding to the retrieval request 242, the media server 250 may retrieve the requested media files from the media database 260. After the retrieval, the media server 250 may then transmit the retrieved media files 254 to the distribution device 240. The distribution device 240 may format the retrieved media files 254, so that they will be compatible with the media playing device 204. In one embodiment, the distribution device 240 may begin the formatting process after receiving the entire media file. In another embodiment, the distribution device 240 may begin the formatting process after receiving a part of the media file. Subsequently, the distribution device 240 may distribute the formatted media file 248 to the media playing device 204.

As shown in FIG. 2, the media content delivery interface 210 may be an individual device. Accordingly, the media content delivery interface 210 may be implemented separately from the positioning device 202, the media playing device 204, the media server 250, and the media database 260. The media content delivery interface 210 may be in communication with the positioning device 202, the media playing device 204, and the media server 250 via one or more hardwired or wireless communication networks. For example, the media content delivery interface 210 may be connected to the media server 250 via a private computer network. In another example, the media content delivery interface 210 may be connected to the media playing device 204 via a short-range wireless network.

Alternatively, the media content delivery interface 210 may be completely or partially incorporated into the positioning device 202, the media playing device 204, the media server 250, and/or the media database 260. In one embodiment, for example, the media content delivery interface 210 may be incorporated into the media playing device 204. In another embodiment, for example, the media content delivery interface 210 may be incorporated into the media server 250. In yet another embodiment, for example, the mapping device 220 may be incorporated into the positioning device 202; the processor 230 may be incorporated into the media server 250 and/or the media playing device 204; and the distribution device 240 may be incorporated into the media database 260.

The discussion now turns to the algorithm of a media content delivery application. The media content delivery application may be executed by a processor, such as the processor 230 as discussed in FIG. 2. Generally, the media content delivery application may be used in various media delivery systems, which may include, but are not limited to, music delivery systems, motion picture delivery system, digitized literature delivery system, and/or digitized art work delivery system.

Figure 3:
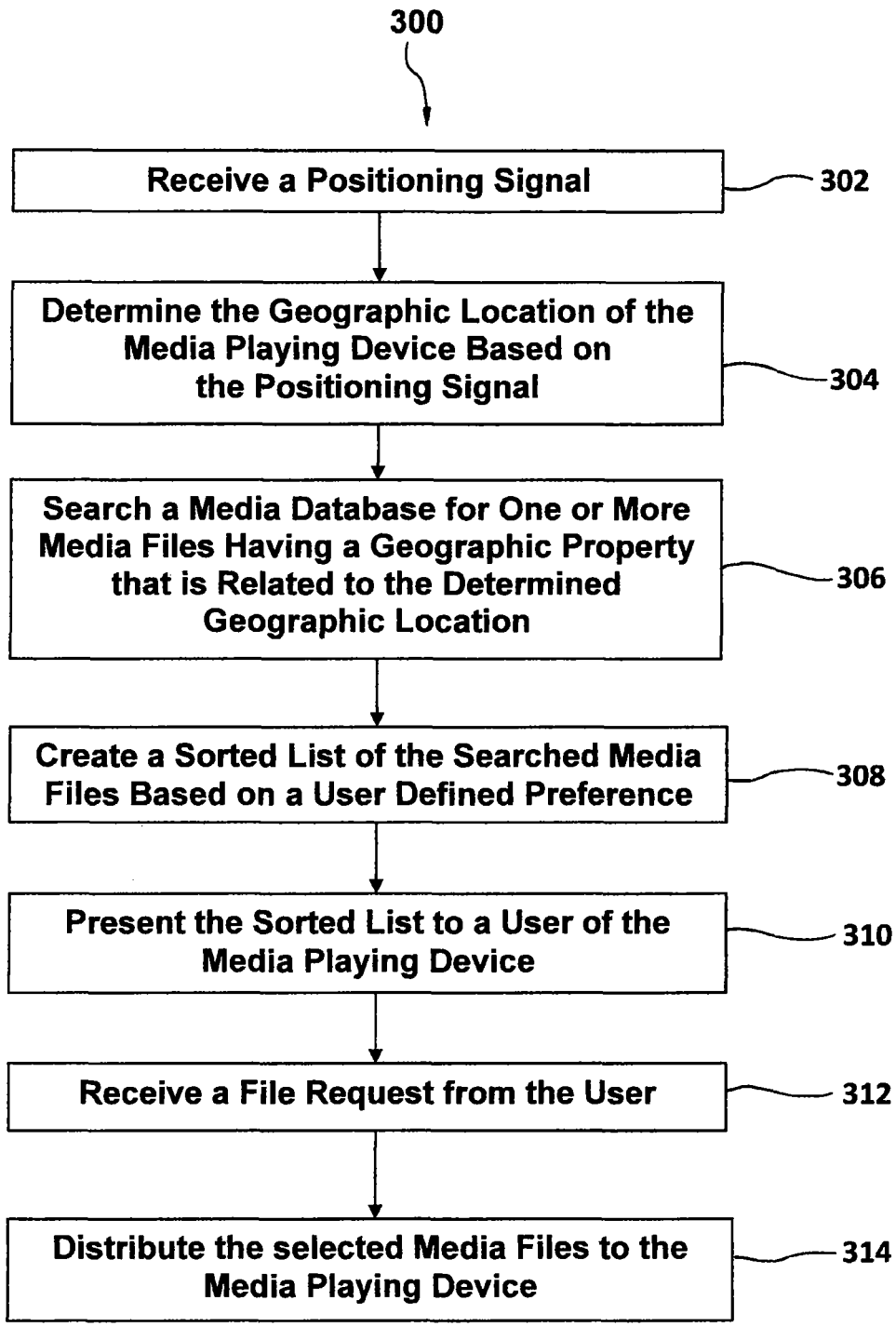
FIG. 3 shows a flowchart of an algorithm of a media content delivery application according to an embodiment of the present invention.

FIG. 3 shows a flowchart of an algorithm of a media content delivery application 300 according to an embodiment of the present invention. When executed by a processor, the content delivery application 300 may cause the processor to perform the following method steps.

In step 302, the processor may receive a positioning signal. The positioning signal may be generated by a positioning device, which may be used for tracking the physical location of the media playing device. The positioning signal may include information that is related to the physical location of the media playing device. For example, the positioning signal may include the real time global coordination of the media playing device. In another example, the positioning signal may include a relative distance between the media playing device and a reference geographic location. The processor may periodically, iteratively, and/or responsively receive the positioning signal. Optionally, the processor may generate an acknowledgement signal each time it successfully receives a positioning signal.

In step 304, the processor may determine the geographic location of the media playing device based on the positioning signal. The processor may extract the information stored in the positioning signal. Then, the processor may ascertain whether the media playing device is located within one or more predefined geographic zones. For example, the processor may detect any overlap between the physical location of the media playing device and one or more predefined geographic zones. Alternatively, the processor may calculate a relative distance between the physical location of the media playing device and the center of each proximate geographic zone. The processor may rank the proximate geographic zones according to their relative distances from the media playing device. Subsequently, the processor may determine the geographic location of the media playing device by selecting the one or more top ranked geographic zones.

Figure 5:
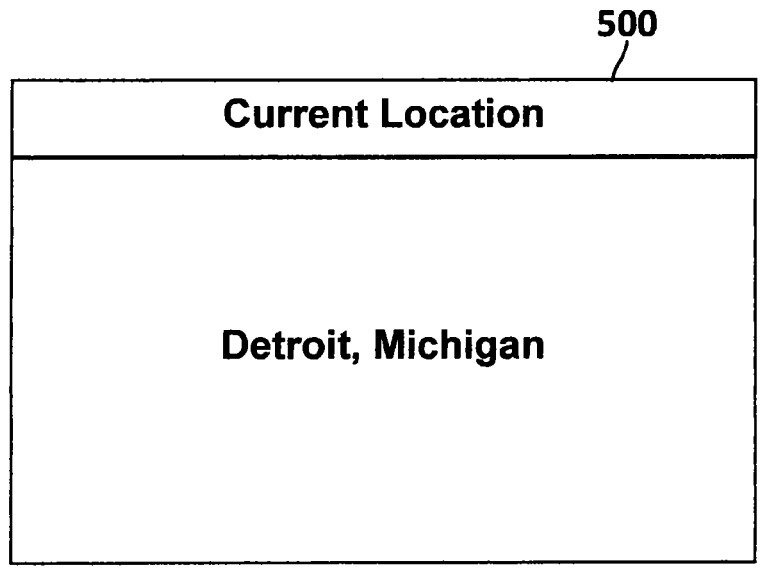
FIG. 5 shows a screen display of a detected current geographic location according to an embodiment of the present invention.

Optionally, the processor may generate a display signal, which may be received by an output device, such as a display screen. The display signal may cause the output device to generate a message for notifying a user that the current geographic location of the media playing device is detected. For example, referring to FIG. 5, the output device may generate a location detected message 500, which may notify a user that the media playing device is currently located within Detroit, Mich.

In step 306, the processor may search a media database for one or more media files. Each of the media files may have a geographic property that is related to the determined geographic location. In general, a geographic property may be defined by the relationship between one or more predefined geographic locations and the media content of a media file. In many situations, a media file may have one or more geographic properties.

In one embodiment, the geographic property of a media file may include the geographic genre of the media content. For example, if the media file is a music file, the geographic genre thereof may be a genre of music that is commonly associated to a particular geographic region. For example, Detroit techno is a geographic genre that is related to the City of Detroit. In another embodiment, the geographic property of a media file may include the place at which the media content was conceived and/or produced. For example, the place of production of a song may be the city at which that song was first recorded. Similarly, the place of conception of a novel may be the town at which that novel was first written.

In another embodiment, the geographic property of a media file may include the origin of the performing and/or composing artists. The origin of an artist may be the place at which the artist was born, has received professional training, and/or conduct professional activities. In yet another embodiment, the geographic property of a media file may include the geographic theme of the media content. The geographic theme of a media file may be a theme that touches upon the lifestyle, events, history, and/or other social aspects of a geographic region. For example, the motion picture "Gangs of New York" may have a geographic theme that is related to the City of New York. Similarly, the song "Hotel California" may have a geographic theme that is related to the State of California.

Before performing the media file search, the processor may receive a search criteria provided by a user. The search criteria may specify which geographic property may be matched against during the search process. After receiving the search criteria, the processor may search a list of records that are associated to a plurality of media files. Each of the records may have one or more fields for storing information regarding the one or more geographic properties of a particular media file. The processor may match the current geographic location of the media playing device against the selected geographic properties of each record. If a match is found, the processor may register the identity of the record in a search report.

Figure 6:
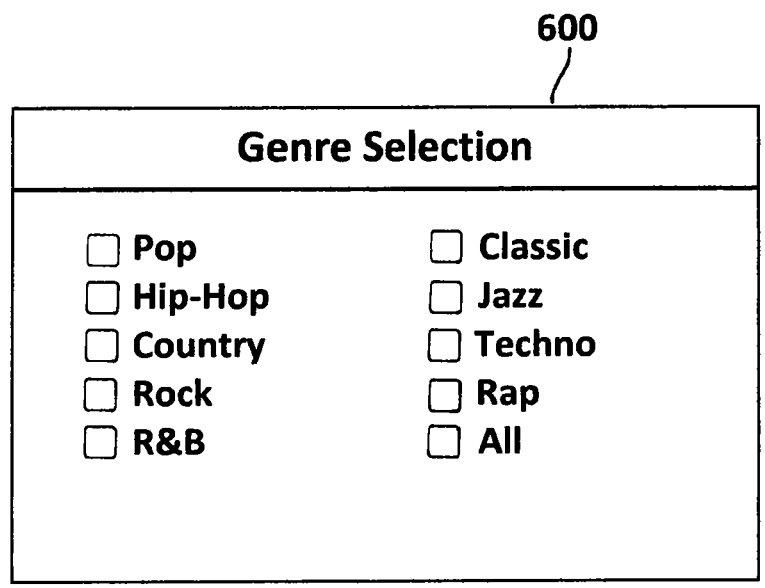
FIG. 6 shows a screen display of a genre selection menu according to an embodiment of the present invention.

In step 308, the processor may create a sorted list of the searched media files based on a user defined preference. A user may filter the search result by selecting one or more search criteria. In one embodiment, a generic genre of the media content may be selected as a search criterion. For example, if the media content includes a song, the generic genre of the song may include pop, hip-hop, country, rock, rhythm and blue (R&B), classic, jazz, techno, and/or rap. As shown in FIG. 6, the processor may instruct an output device, such as a display screen, to display a genre selection menu 600. A user may select one or more options provided in the genre selection menu 600 in defining the search filter.

Figure 7:
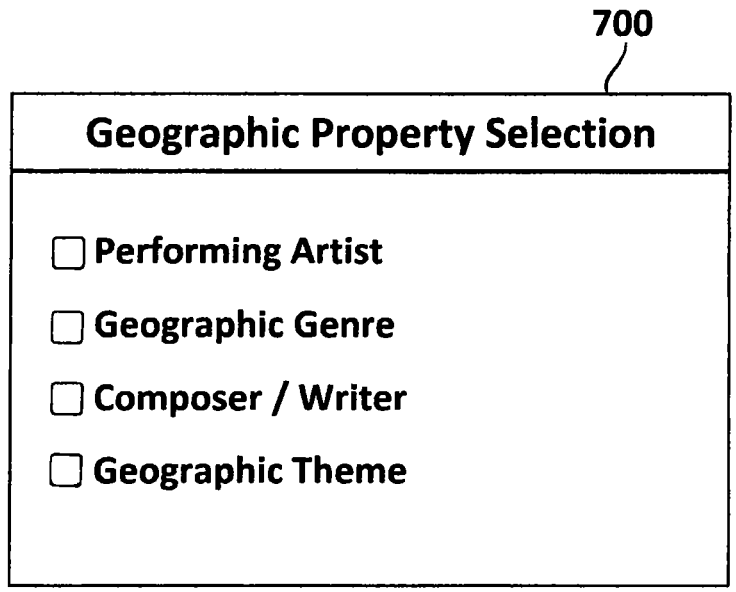
FIG. 7 shows a screen display of a geographic property selection menu according to an embodiment of the present invention.

In another embodiment, a geographic property of the media content may be selected as a search criterion. As discussed previously, a geographic property of the media content may include, but is not limited to, the origin of the performing artist, the geographic genre, the origin of the composer, and/or the geographic theme. As shown in FIG. 7, the processor may instruct an output device, such as a display screen, to display a geographic property selection menu 700. A user may select one or more options provided in the geographic property selection menu 700 in defining the search filter.

Moreover, a user may combine the options selected from the genre selection menu 600 and the geographic property selection menu 700. For example, the genre option "rock" and the geographic property option "performing artist" may both be selected. As such, the search result may include music files that contain rock music that are performed by artists from a particular geographic location, such as Detroit, Mich.

Figure 8:
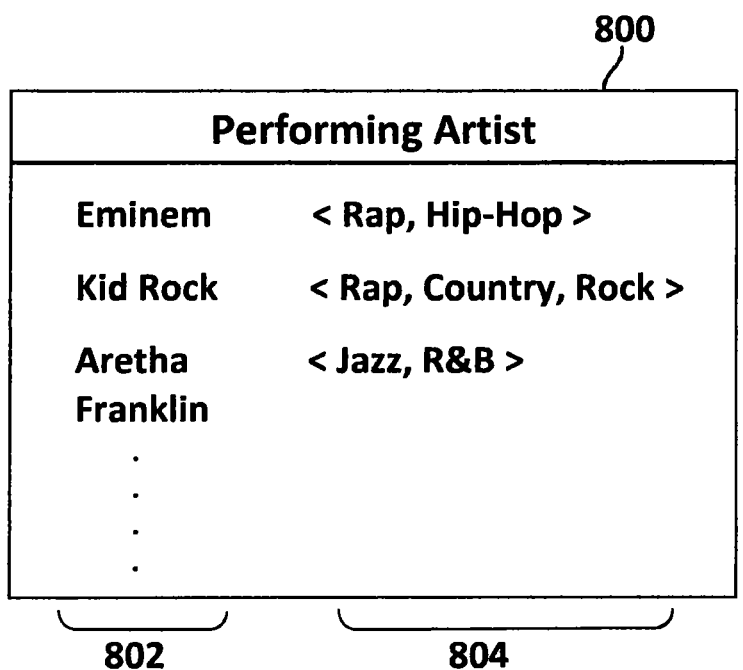
FIG. 8 shows a screen display of a sorted list of performing artists according to an embodiment of the present invention.

In step 310, the processor may present the sorted list to a user of the media playing device. The sorted list may be arranged according to the user defined preference. After reviewing the sorted list, the user may select one or more media files for downloading and/or streaming. As shown in FIG. 8, for example, a sorted list 800 may include a list of performing artists 802 and a list of generic genre 804 next to each of the performing artists 802. The sorted list 800 may be shown when the user selects multiple generic genres from the genre selection menu 600.

Figure 9:
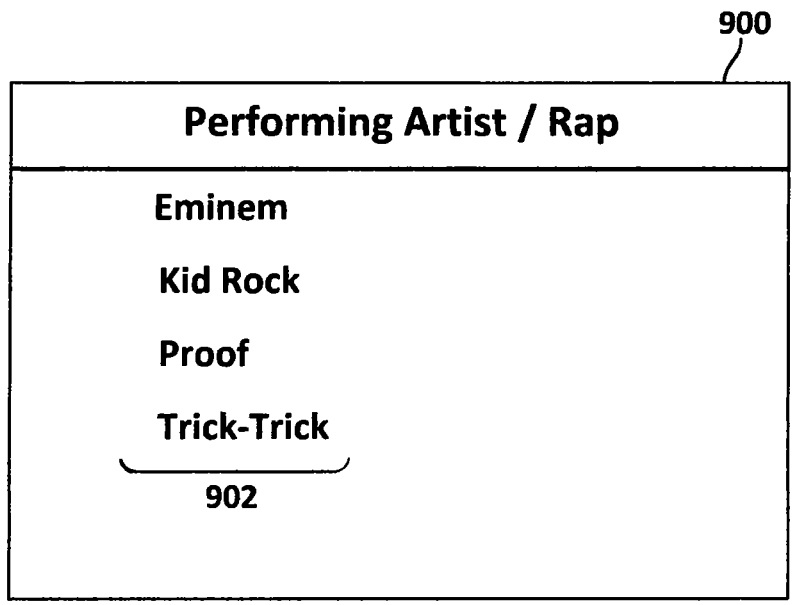
FIG. 9 shows a screen display of a sorted list of performing artists in a specific genre according to an embodiment of the present invention.

If the user only selects one generic genre from the genre selection menu 600, the sorted list may be arranged differently. As shown in FIG. 9, for example, a sorted list 900 may include a group of performing artists 902 with a specific generic genre, such as rap music. In any event, when a user selects one of the performing artists 802 from the sorted list

800 and/or the sorted list 900, the output device may further display a list of songs that are performed by the selected performing artist.

Figure 10:
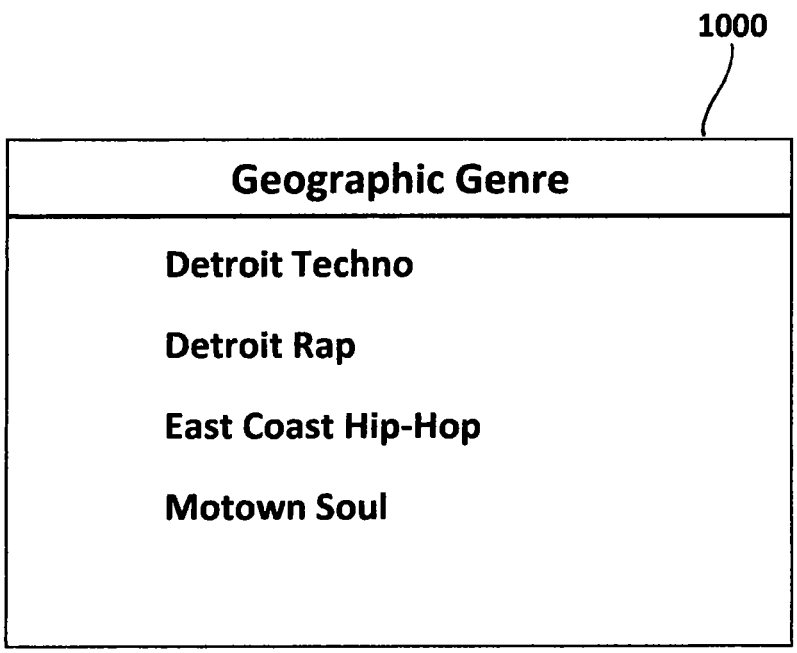
FIG. 10 shows a screen display of a sorted list of geographic genre according to an embodiment of the present invention.

If the user selects the geographic genre option from the geographic property selection menu 700, the generic genre option may be overridden. As shown in FIG. 10, the search result may return a geographic genres sorted list 1000. For example, the geographic genres of music originated from the Detroit area may include Detroit Techno, Detroit Rap, East Coast Hip Hop, and/or Motown Soul. When a user selects one of the geographic genres from the geographic genres sorted list 1000, the output device may further display a list of songs that belong to the selected geographic genre.

In step 312, the processor may receive a file request from the user. The file request may be generated by an input device, and it may include one or more media files that the user has selected. Moreover, the file request may specify the mode of distribution, which may include a full download mode and/or a real-time streaming mode. After receiving the file request, the processor may set up a digitized distribution channel between the media server and the media playing device.

In step 314, the processor may distribute the selected media files to the media playing device. Particularly, the processor may instruct the media server to retrieve the selected media files from the associated media database. Optionally, the processor may format the retrieved media files to ensure that they will be compatible with the media playing device. When multiple media files are being distributed, the processor may assign each media file with its own digitized distribution channel. In one embodiment, each of the digitized distribution channels may have the same bandwidth and receive the same priority. In another embodiment, the distribution channels may have various bandwidths and receive different priorities. The bandwidth and priority of each distribution channel may depend on various factors, such as the technical capacity of the media playing device, the usage of the network, and a distribution sequence that is defined by a user.

The discussion now turns to the algorithm of a media file maintenance application. The media file maintenance application may be executed by a processor, such as the media server 250 as discussed in FIG. 2. Generally, the media file maintenance application, upon being executed by the processor, may be used for managing a media database by tracking one or more geographic properties of the media content contained in the media file.

Figure 4:
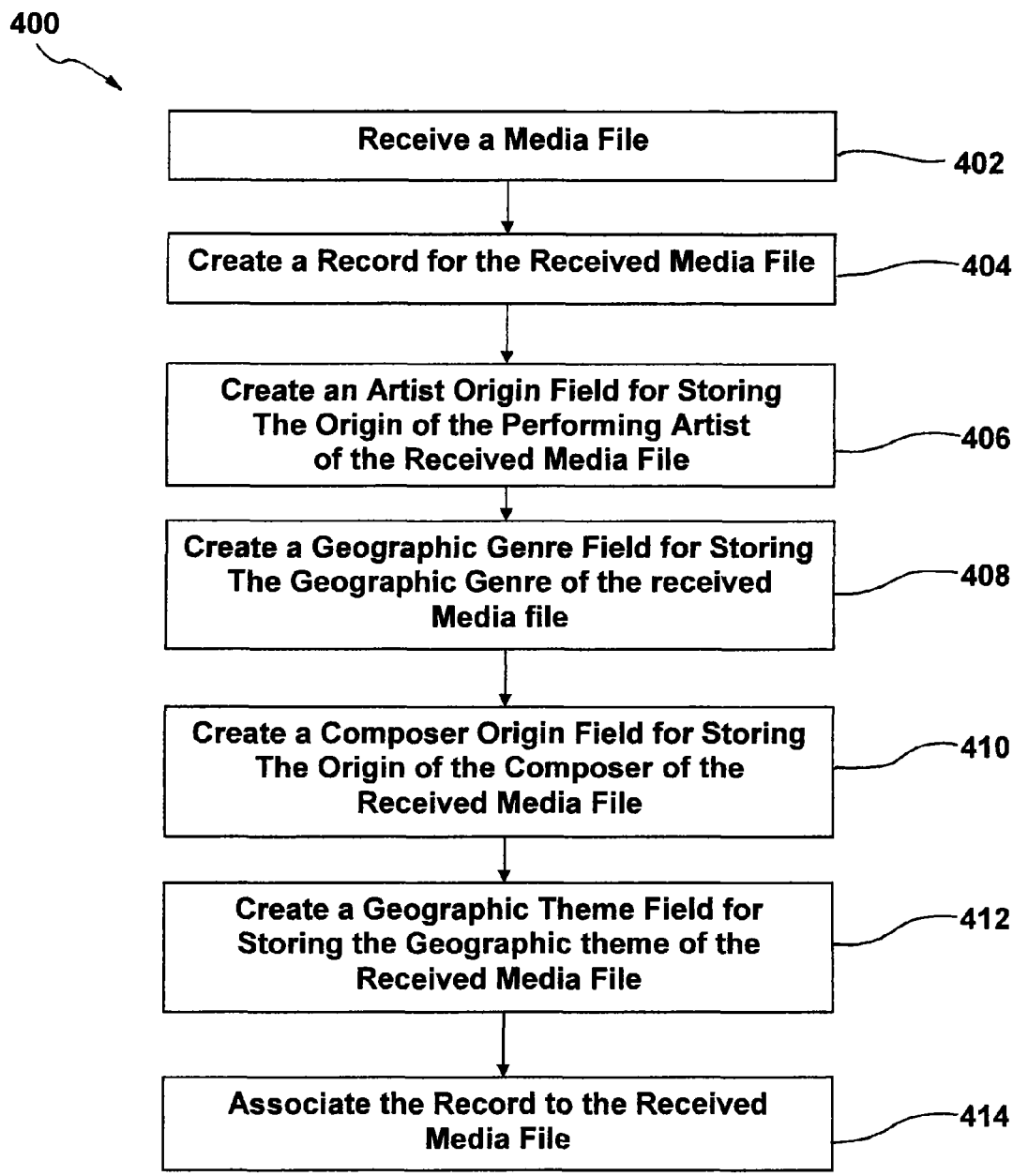
FIG. 4 shows a flowchart of an algorithm of a media file maintenance application according to an embodiment of the present invention.

FIG. 4 shows a flowchart of an algorithm of a media file maintenance application 400 according to an embodiment of the present invention. When executed by a processor, the media file maintenance application 400 may cause the processor to perform the following method steps.

In step 402, the processor may receive a media file. Generally, a media file may be used for storing one or more types of media content. The types of media content may include, but are not limited to, music, motion picture, short video, music video, digitized literature, audio literature, and/or digitized visual art work (e.g., a digitized painting). The processor may save the received media file in a media database. In order to identify and/or retrieve the saved media file, the processor may assign the saved media file with a file identity code. The file identity code may be embedded in the header of the saved media file.

In step 404, the processor may create a record for the received media file. The record may be saved in the media database. Alternatively, the record may be saved in a separate database. The record may include a title and a record identity code. The title may help a user identify the media content to which the record is directed, while the record identity code may help the processor to identify and retrieve the saved record.

In step 406, the processor may create an artist origin field for storing the origin of the performing artist of the received media file. The origin of the performing artist may include the place of birth, place of professional training, and/or place of performance of the performing artist. For example, the artist origin field of a record may store the text "Detroit," when the record is directed to a song that is performed by a Detroit singer, such as Eminem, Kid Rock, and/or Aretha Franklin.

In step 408, the processor may create a geographic genre field for storing the geographic genre of the received media file. The geographic genre field may be added before or after the artist origin field. The geographic genre of the media content may be used for associating a type of media content with a particular geographic area. For example, Motown Soul is a geographic genre of songs that are originated from the Detroit area, or of songs that follow the style of Motown Soul.

In step 410, the processor may create a composer origin field for storing the origin of the composer of the received media filed. The composer origin field may be added before or after the geographic genre field. The origin of the composer may include the composer's place of birth, place of professional training, and/or place of composition. For example, the composer origin field of a record may store the text "Detroit," when the record is directed to the song "8-Mile," the lyrics of which is composed by Eminem, a Detroit composer.

In step 412, the processor may create a geographic theme field for storing the geographic theme of the received media file. The geographic theme field may be added before or after the composer origin field. A media file may have a geographic theme when the media content contained thereof describes, discussed, and/or depicted topics related to a particular geographic area. These topics may include, but are not limited to, famous people, social events, historic events, lifestyles, people, and/or legends of a particular geographic area. For example, the City of New York may be the geographic theme of the motion picture "Sex and the City."

In step 414, the processor may associate the record to the received media file. In one embodiment, the processor may associate the file identity code of the received media file with the record identity code of the saved record. In another embodiment, the processor may add the record identity code to the header of the received media file. In any event, the processor may be able to locate and retrieve the received media file by searching for the record that is associated with that media file.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A non-transitory computer storage medium storing instructions that when executed by a processor, cause the processor to perform a method for delivering media content, comprising the steps of:

determining a geographic location of a media playing device;

providing, using a media database, a plurality of media files, each media file having at least one searchable geographic field that indicates a geographic property associated with the each media file;

searching the media database to generate a search report listing at least one media file of the plurality of media files having a geographic property in the searchable geographic field related to the determined geographic location;

displaying, using a display, at least one media file related to the determined geographic location;

receiving a retrieval request including a selection of a media file from the displayed at least one media file; and distributing the selected media file to the media playing device.

2. The non-transitory computer storage medium of claim 1, wherein the geographic property of the at least one media file listed in the search report includes a performing artist origin.

3. The non-transitory computer storage medium of claim 1, wherein the geographic property of the at least one media file listed in the search report includes a composer origin.

4. The non-transitory computer storage medium of claim 1, wherein the geographic property of the at least one media file listed in the search report includes a geographic genre.

5. The non-transitory computer storage medium of claim 1, wherein the geographic property of the at least one media file listed in the search report includes a geographic theme.

6. The non-transitory computer storage medium of claim 1, wherein the determining step includes:
  tracking a physical location of the media playing device,
  fitting the physical location of the media playing device into a plurality of predefined geographic zones, and
  identifying at least one fitted geographic zone of the plurality of predefined geographic zones.

7. The non-transitory computer storage medium of claim 1, wherein the searching step includes:
  accessing a plurality of records, each associated with one of the plurality of media files,
  matching the determined geographic location against information stored in a searchable geographic field of each of the plurality of records, and
  upon identifying a matched record from the plurality of records, locating at least one media file, from the plurality of media files, associated with the matched record.

8. The non-transitory computer storage medium of claim 1, wherein the selectively distributing step includes:
  receiving a user selection from the retrieval request, and
  distributing the selected media file from the media database to the media playing device based on the user selection.

9. The non-transitory computer storage medium of claim 1, wherein the media playing device includes an electronic music playing device selected from a group consisting of a portable computer, an electronic tablet, a portable gaming console, a cellular phone, a smart phone, an MP3 player, a satellite radio, an Internet radio, and combinations thereof.

10. The non-transitory computer storage medium of claim 1, wherein the media playing device includes an electronic video playing device selected from a group consisting of a portable computer, an electronic tablet, a smart phone, a portable DivX player, a portable AVI player, a portable WMI player, a portable MPEG player, a portable gaming console, a portable video player, and combination thereof.

11. A non-transitory computer storage medium storing instructions that when executed by a processor, cause the processor to perform a method for managing a media database and for delivering media content, comprising the steps of:
  receiving a media file;
  embedding a file identity code in the media file;
  creating a record in the media database for the received media file;
  creating a searchable geographic field in the record for storing a geographic property of the received media file;
  associating the record to the received media file;
  determining a geographic location of a media playing device;
  searching the media database to generate a search report listing at least one media file of the plurality of media files having a geographic property in the searchable geographic field related to the determined geographic location;
  displaying, using a display, at least one media file related to the determined geographic location;
  receiving a retrieval request including a selection of a media file from the displayed at least one media file; and
  distributing the selected media file to the media playing device.

12. The non-transitory computer storage medium of claim 11, wherein the searchable geographic field includes a performing artist origin field.

13. The non-transitory computer storage medium of claim 11, wherein the searchable geographic field includes a composer origin field.

14. The non-transitory computer storage medium of claim 11, wherein the searchable geographic field includes a geographic genre field.

15. The non-transitory computer storage medium of claim 11, wherein the searchable geographic field includes a geographic theme field.

16. The non-transitory computer storage medium of claim 11, wherein the distributed media file is a music file.

17. The non-transitory computer storage medium of claim 11, wherein the distributed media file is a video file.

18. A media content delivery interface, comprising:
  a mapping device configured to receive a positioning signal and determine a geographic location of a media playing device based on the positioning signal;
  a processor configured to:
    receive the geographic location from the mapping device,
    generate a search signal for searching a media database having a plurality of media files, each media file having at least one searchable geographic field that indicates a geographic property associated with the each media file, and
    generate a search report listing media files, each media file in the search report having a geographic property in the searchable geographic field related to the geographic location;
  a display for displaying a list of media files related to the geographic location; and
  a distribution device coupled to the processor, configured to generate a retrieval request including a selection of a media file from the displayed list of media files and distribute the selected media file from the media database to the media player device.

19. The media content delivery interface of claim 18, wherein the distributed media file include at least one of a music file, a video file, a text file, or a picture file.

20. The media content delivery interface of claim 18, wherein the geographic property of the each media file listed in the search report is selected from a group consisting of a performing artist geographic origin, a composer geographic origin, a geographic theme, a geographic genre, and combinations thereof.

21. A non-transitory computer storage medium storing instructions that when executed by a processor, cause the processor to perform a method for delivering media content, comprising the steps of:

determining a geographic location of a media playing device;

providing, using a media database, a plurality of media files, each media file having at least one searchable geographic field that indicates a geographic property associated with the each media file;

receiving a search criterion indicating a user-defined geographic property;

searching the media database to generate a search report listing at least one media file of the plurality of media files having a searchable geographic field related to the determined geographic location and the user-defined geographic property;

displaying, using a display, at least one media file related to the determined geographic location and the user-defined geographic property;

receiving a retrieval request including a selection of a media file from the displayed at least one media file; and distributing the selected media file to the media playing device.

22. A non-transitory computer storage medium storing instructions that when executed by a processor, cause the processor to perform a method for delivering media content, comprising the steps of:

determining a geographic location of a media playing device;

providing, using a media database, a plurality of media files, each media file having at least one searchable geographic field that indicates a geographic property associated with the each media file;

searching the media database to generate a search report listing at least one media file of the plurality of media files having a searchable geographic field related to the determined geographic location;

displaying, using a display, at least one media file related to the determined geographic location;

receiving a retrieval request including a selection of a media file from the displayed at least one media file;

distributing the selected media file to the media playing device;

determining an updated geographic location of the media playing device; and updating the search report to generate an updated search report listing including at least one new media file of the plurality of media files having a searchable geographic field related to the updated geographic location.

\* \* \* \* \*